United States Patent [19]
Snyder

[11] 3,829,045
[45] Aug. 13, 1974

[54] RISER CONTROLS FOR GLIDING PARACHUTES

[76] Inventor: Stephen L. Snyder, 331 Cherry Hill Blvd., Cherry Hill, N.J. 08034

[22] Filed: Apr. 14, 1972

[21] Appl. No.: 244,034

[52] U.S. Cl. ............................................. 244/152
[51] Int. Cl. ............................................ B64d 17/34
[58] Field of Search .......... 244/152, 151, 142, 145, 244/146; 2/237

[56] References Cited
UNITED STATES PATENTS

| | | | |
|---|---|---|---|
| 2,233,136 | 2/1941 | Larson et al. | 2/237 |
| 2,458,264 | 1/1949 | Hart | 244/152 |
| 3,117,753 | 1/1964 | Ewing | 244/152 |

Primary Examiner—Milton Buchler
Assistant Examiner—Charles E. Frankfort
Attorney, Agent, or Firm—Clarence A. O'Brien; Harvey B. Jacobson

[57] ABSTRACT

The effective length of risers interconnecting a body harness and the suspension lines of a forward glide-type parachute, are differentially varied to exercise control over the canopy for attitude control purposes. Frictional buckle devices and control straps on one or more of the risers enables the chutish to infinitely vary the relative spacing between the ends of the risers.

11 Claims, 6 Drawing Figures

PATENTED AUG 13 1974 3,829,045
SHEET 1 OF 2
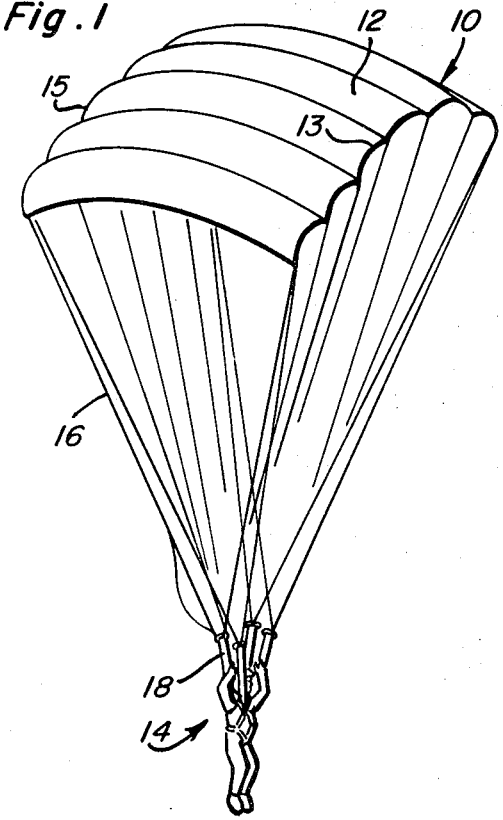
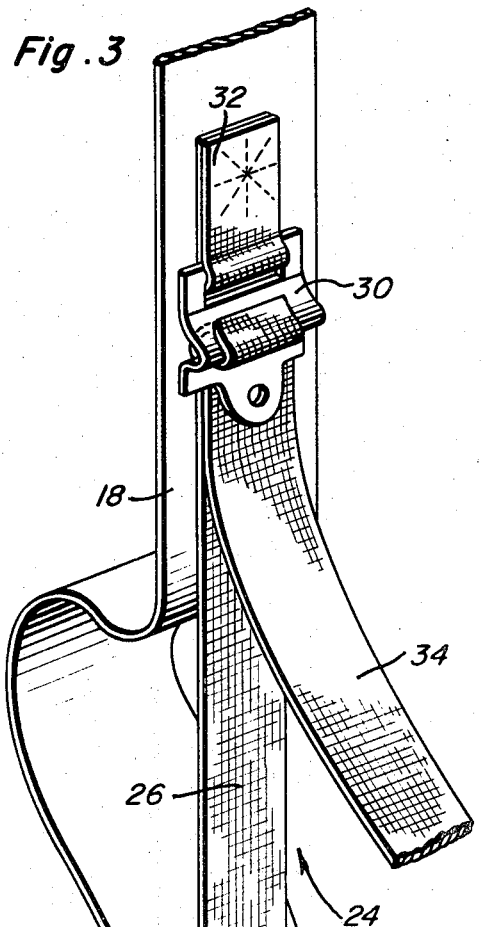
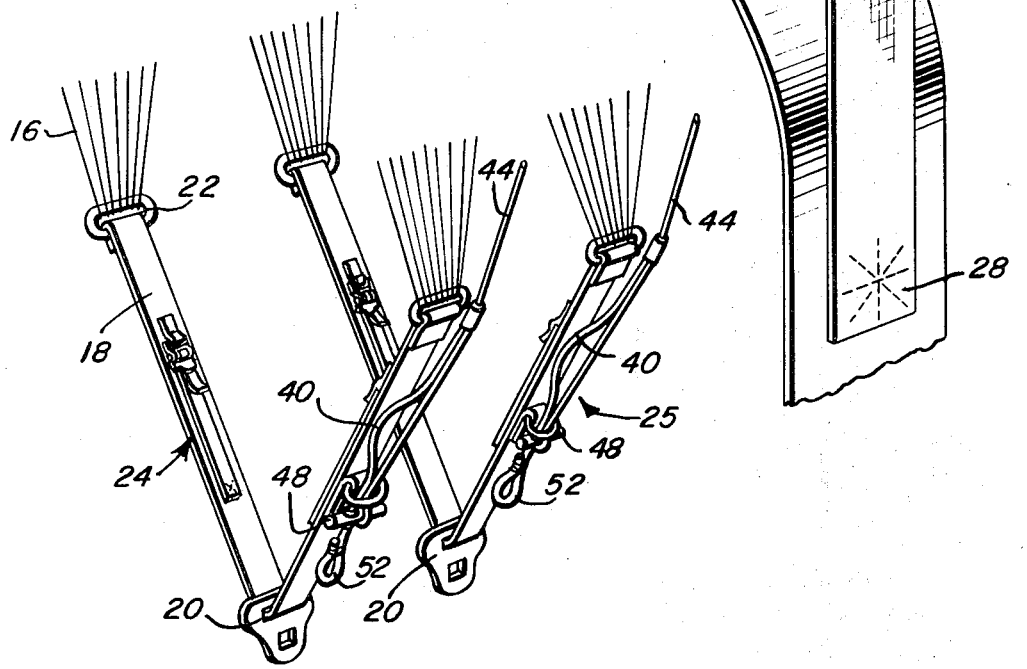

RISER CONTROLS FOR GLIDING PARACHUTES

This invention relates to parachute controls in general and more particularly to maneuvering controls for parachutes of the forward gliding type.

The provision of manually operable controls on the risers which interconnect the body harness and the suspension lines of a parachute, are well known. Such controls generally involve the attachment of control lines to selected suspension or shroud lines in order to enable the chutist to effect relative deflection of leading and trailing edge portions of the parachute canopy. Control over forward gliding types of parachutes require, however, both differential and variable regulation of the riser strap lengths to be effective. Thus, an important object of the present invention is to provide means for enabling a parachutist to exercise effective maneuvering control over a forward gliding type of parachute.

In order to exercise effective control in accordance with the foregoing objective, it is necessary that the chutist be capable of infinitely varying the relative effective lengths of the risers or the spacing between the ends of the risers while under tension to which the suspension lines and the payload harness are respectively connected. Toward this end, one or more of the riser webs are provided with control straps anchored to the riser web and threaded through a frictional buckle device in order to enable the chutist to shorten the maximum effective length of the riser web by an infinitely variable amount. The rear risers are also provided with canopy brake controls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating a typical forward gliding type of a parachute in operation, with which the present invention is associated.

FIG. 2 is a perspective view showing a portion of the parachute illustrated in FIG. 1 with the maneuvering controls installed.

FIG. 3 is an enlarged partial sectional view showing one of the riser webs and control means attached thereto.

Figure 4:
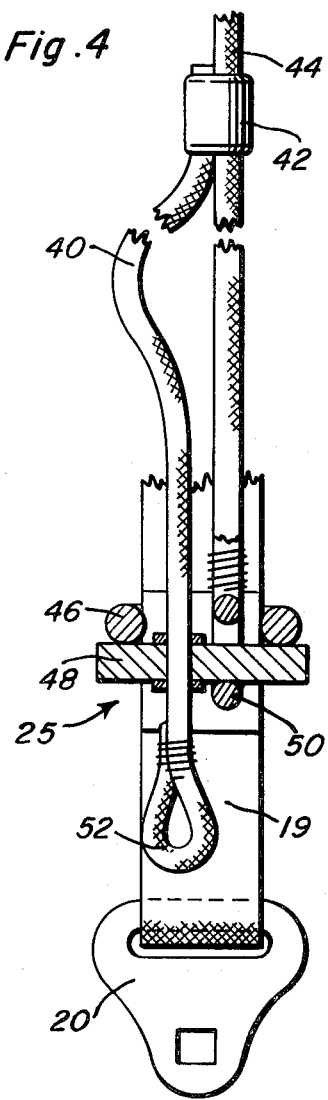
FIG. 4 is an enlarged partial sectional view showing another of the riser webs with a brake control mounted thereon.

Referring now to the drawings in detail, FIG. 1 illustrates a typical parachute generally denoted by reference numeral 1 which is of the forward gliding type. The invention may be applied to various types of parachutes having forward gliding capabilities. In the illustrated embodiment, the parachute 10 by way of example includes a "parawing" type of canopy 12 from which the payload or chutist 14 is shown suspended. Also, the parachute 10 is similar to most parachutes in that a plurality of suspension or shroud lines 16 are attached to various portions of the canopy 12 at their upper ends including the leading edge portion 13 and the trailing edge portion 15, while the lower ends of the suspension lines are connected in groups to two pair of the usual type of non-extensible riser webs 18. The riser webs are in turn connected to the shoulder portions of the body harness worn by the chutist 14.

As more clearly seen in FIG. 2, each pair of riser webs 18 and 19 are connected to the body harness on either shoulder of the chutist through a harness buckle 20. The upper ends of the risers on the other hand, are provided with swivel devices 22 to which different groups of the suspension lines 16 are anchored. By controlling the effective length of the riser webs relative to each other or the spacing between the harness buckles 20 and the swivel devices 22, the chutist may be able to control the maneuvering of the parachute by relative deflection of portions of the canopy 12 to which the different groups of suspension lines 16 are connected. Accordingly, one or more of the riser webs 18 is provided with a length adjusting control device generally denoted by reference numeral 24 which is within easy reach of the chutist. Also, the rear riser webs 19 are provided with canopy brake controls 25 of the toggle type.

Each of the riser webs 18 has a maximum effective length as shown in FIG. 2 which may be reduced by an infinitely variable amount as shown in FIG. 3. Each control device 24 accordingly includes a non-extensible control strap 26 as shown fixedly anchored to the riser web at a lower end 28. The control strap is threaded through a friction holding buckle device 30 which is mounted on the riser web 18 by means of the anchoring web 32 fixedly spaced from the anchoring location 28 for the control strap 26. It will therefore be apparent, that the chutist may shorten the effective length of the riser web 18 to any degree by pulling the control strap 26 through the frictional holding buckle device 30 by means of trim tab portions 34. In this fashion, the chutist may differentially vary the spacing between the four different groups of suspension lines 16 and the body harness within which the chutist is supported to regulate the relative position of the leading and trailing edge portions 13 and 15 for attitude control. By pushing on the tabs 34, the buckle device 30 may be loosened to release the control strap permitting the control device to be reset under the tension applied to the web 18.

Figure 5:
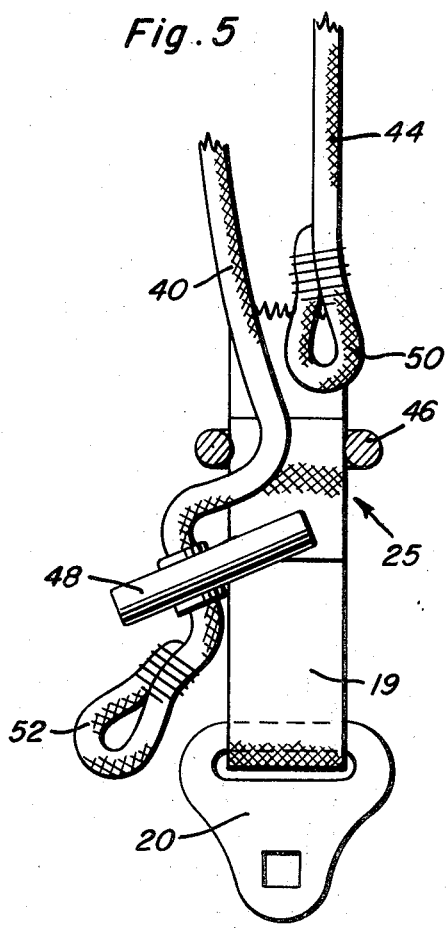
FIG. 5 is a view similar to FIG. 4 showing the brake control released.
Figure 6:
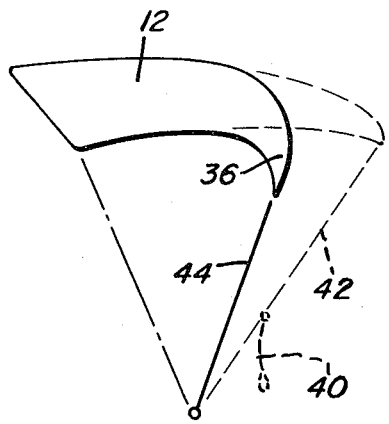
FIG. 6 is a simplified schematic view showing the braking action on the parachute.

In conjunction with attitude control, turning and landing control may be exercised through the brake controls 25. The brake controls operate to distort the trailing edge portion 36 of the parachute as shown by solid line in FIG. 6 and includes the toggle pin 38 connected to a slack brake control line 40 secured at 42 to a shorter steering line 44. The steering line 44 as more clearly seen in FIG. 4, extends through the toggle ring 46 which is secured to the riser web 19. In order to hold the steering line under tension during deployment of the parachute, a toggle pin 48 extends through a holding loop 50 at the end of the steering line while in abutment with the toggle ring. The brake control line 40 is fixed to the toggle pin so that the chutist may exert an off-center pull thereon through release loop 52 in order to withdraw the toggle pin from loop 50 of the steering line, as shown in FIG. 5. When the steering line is released, the trailing end portion 36 of the parachute may assume a non-braking position, as shown by dotted line in FIG. 6 for forward glide.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a parachute having a canopy, a plurality of suspension lines connected thereto, a payload harness and a plurality of riser webs of fixed effective lengths interconnecting the harness with different groups of said suspension lines, and operator controlled means for selectively adjusting the relative effective lengths of said riser webs while under tension by an infinitely variable amount.

2. In combination with a parachute having a canopy, a plurality of suspension lines connected thereto, a payload harness and a plurality of riser webs of fixed effective lengths interconnecting the harness with different groups of said suspension lines, and means for selectively adjusting the relative effective lengths of said riser webs while under tension by an infinitely variable amount, said adjusting means including a non-extensible control strap anchored to at least one of said riser webs at one location, and frictional holding means mounted on said riser web fixedly spaced from said one location for engagement with said control strap.

3. The combination of claim 2 wherein said frictional holding means is a buckle device through which the control strap is threaded.

4. The combination of claim 3 wherein the harness includes a pair of buckles to which the riser webs are connected, and swivel devices connected to the riser webs from which the suspension lines extend, each of said riser webs having a fixed maximum length.

5. The combination of claim 2, wherein the adjusting means further includes reset means for releasing the control strap from engagement by the frictional holding means to restore the riser web to an initial length under the tension applied thereto.

6. In combination with a parachute having a canopy, a plurality of suspension lines connected thereto, a payload harness and a plurality of riser webs of fixed effective lengths interconnecting the harness with different groups of said suspension lines, and means for selectively adjusting the relative effective lengths of said riser webs while under tension by an infinitely variable amount, the harness including a pair of buckles to which the riser webs are connected, and swivel devices connected to the riser webs from which the suspension lines extend, each of said riser webs having a fixed maximum length, said adjusting means including a control strap anchored to at least one of said riser webs at one location, and frictional holding means mounted on said riser web fixedly spaced from said one location for engagement with said control strap.

7. In combination with a parachute having a canopy and suspension lines connected to a body harness by a plurality of risers of fixed adjusted lengths under tension, maneuvering control means comprising a control strap fixedly anchored to at least one of the risers, and selectively operable means mounted on said one of the risers for engagement with the control strap to reduce the effective adjusted length of said one of the risers relative to the other of the risers by an infinitely variable amount.

8. The combination of claim 7 wherein said control strap engagement means comprises a frictional buckle device through which the control strap is threaded.

9. The combination of claim 8 wherein said canopy is of the type having a forward glide characteristic.

10. The combination of claim 7 wherein said canopy is of the type having a forward glide characteristic.

11. The combination of claim 7, wherein the said length varying means includes reset means for releasing the control strap under the tension applied to the riser to restore the riser to an initial effective length from which it is varied.

* * * * *